United States Patent [19]

Kishi et al.

[11] Patent Number: 4,745,491
[45] Date of Patent: May 17, 1988

[54] IMAGE FORMATION APPARATUS CAPABLE OF DESIGNATING A RECORDING AREA

[75] Inventors: Hirotoshi Kishi, Tokyo; Tadashi Sato, Kokubunji; Haruo Tsunoi, Kawasaki, all of Japan

[73] Assignee: Canon Kabushiki Kaisha, Tokyo, Japan

[21] Appl. No.: 756,338

[22] Filed: Jul. 18, 1985

Related U.S. Application Data

[63] Continuation of Ser. No. 559,832, Dec. 8, 1983, abandoned, which is a continuation of Ser. No. 291,633, Aug. 10, 1981, abandoned.

[30] Foreign Application Priority Data

Aug. 20, 1980 [JP] Japan ................... 55-114208

[51] Int. Cl.⁴ ............ H04N 1/23; G03G 15/00; G08C 21/00
[52] U.S. Cl. ................... 358/300; 178/18; 355/7
[58] Field of Search ......... 358/300, 296; 178/18, 178/19, 20; 346/154, 153.1, 159; 355/3 R, 7

[56] References Cited

U.S. PATENT DOCUMENTS

| | | | |
|---|---|---|---|
| 3,103,849 | 9/1963 | Wise | 88/24 |
| 3,465,359 | 8/1967 | Hackley et al. | 346/23 |
| 3,698,006 | 10/1972 | Ovshinsky | 346/74 ES |
| 3,928,718 | 12/1975 | Sagae et al. | 178/6.6 R |
| 4,009,954 | 3/1977 | Ritzerfeld | 355/7 |
| 4,026,642 | 5/1977 | Tanaka et al. | 355/1 |
| 4,079,194 | 3/1978 | Kley | 178/18 |
| 4,094,606 | 6/1978 | Camphausen | 355/3 R |
| 4,106,061 | 8/1978 | Burnett | 358/296 |
| 4,121,260 | 10/1978 | Dye et al. | 358/295 |
| 4,155,103 | 5/1979 | Gamblin et al. | 358/296 |
| 4,160,257 | 7/1979 | Carrish | 346/159 |
| 4,164,622 | 8/1979 | Pogbee | 178/18 |
| 4,215,929 | 8/1980 | Sato et al. | 355/7 |
| 4,256,400 | 3/1981 | Komori et al. | 355/7 |
| 4,268,164 | 5/1981 | Yajima et al. | 355/41 |
| 4,275,423 | 6/1981 | Takahashi et al. | 358/285 |
| 4,316,199 | 2/1982 | Greenig et al. | 346/160 |
| 4,325,086 | 4/1982 | Sato et al. | 358/296 |
| 4,371,898 | 2/1983 | Nakamura | 358/300 |
| 4,435,723 | 3/1984 | Seimiya et al. | 346/154 |

FOREIGN PATENT DOCUMENTS

2843975 4/1979 Fed. Rep. of Germany.

*Primary Examiner*—Joseph W. Hartary
*Assistant Examiner*—Mark Reinhart
*Attorney, Agent, or Firm*—Fitzpatrick, Cella, Harper & Scinto

[57] ABSTRACT

This specification discloses an image formation apparatus which is provided with an original reading-out scanner for converting an original image into a video signal and in which an original supporting table for supporting an original thereon comprises an input device capable of indicating and inputting any coordinates and the original reading-out scanner is provided in opposed relationship with the original supporting table.

24 Claims, 2 Drawing Sheets

IMAGE FORMATION APPARATUS CAPABLE OF DESIGNATING A RECORDING AREA

This is a continuation of application Ser. No. 559,832, filed Dec. 8, 1983, now abandoned, which in turn is a continuation of application Ser. No. 291,633, filed Aug. 10, 1981, now abandoned.

BACKGROUND OF THE INVENTION

1. Field of the Invention

This invention relates to an image formation apparatus capable of designating a recording area, and further to an image formation apparatus having an original reading-out scanner for reading out video signals.

2. Description of the Prior Art

When an original is to be copied, it is often the case that it is desired to copy only a part of the original. A heretofore known method of copying with such a situation has been an optical one which comprises providing a movable mask plate in a portion of the original supporting table of a copying apparatus and masking an unnecessary part of the original by this mask plate.

Accordingly, with the conventional devices, accurate position adjustment of the masked part of the original has been difficult and much time has been required for the position adjustment and handling has been cumbersome.

Another device capable of designating a recording area is one disclosed in previous U.S. application Ser. No. 73,488 filed Sept. 7, 1979, wherein the indication is effected from outside the area of an original by a pointer. However, in such device, the masked area on the original is indicated by the use of a pointer and therefore, it has been somewhat difficult to indicate a desired position on the original accurately and quickly.

SUMMARY OF THE INVENTION

It is therefore an object of the present invention to provide an image formation apparatus which is capable of accurately indicating a recording area.

It is another object of the present invention to provide an image formation apparatus which is capable of directly indicating a recording area on an original.

It is still another object of the present invention to provide an image recording apparatus which is capable of quickly indicating a recording area.

It is yet still another object of the present invention to provide an image recording apparatus which is capable of simply indicating a recording area or a non-recording area.

The invention will become fully apparent from the following detailed description thereof taken in conjunction with the accompanying drawings.

DESCRIPTION OF THE PREFERRED EMBODIMENT

The invention will hereinafter be described with respect to an embodiment thereof and with reference to the drawings.

Figure 1:
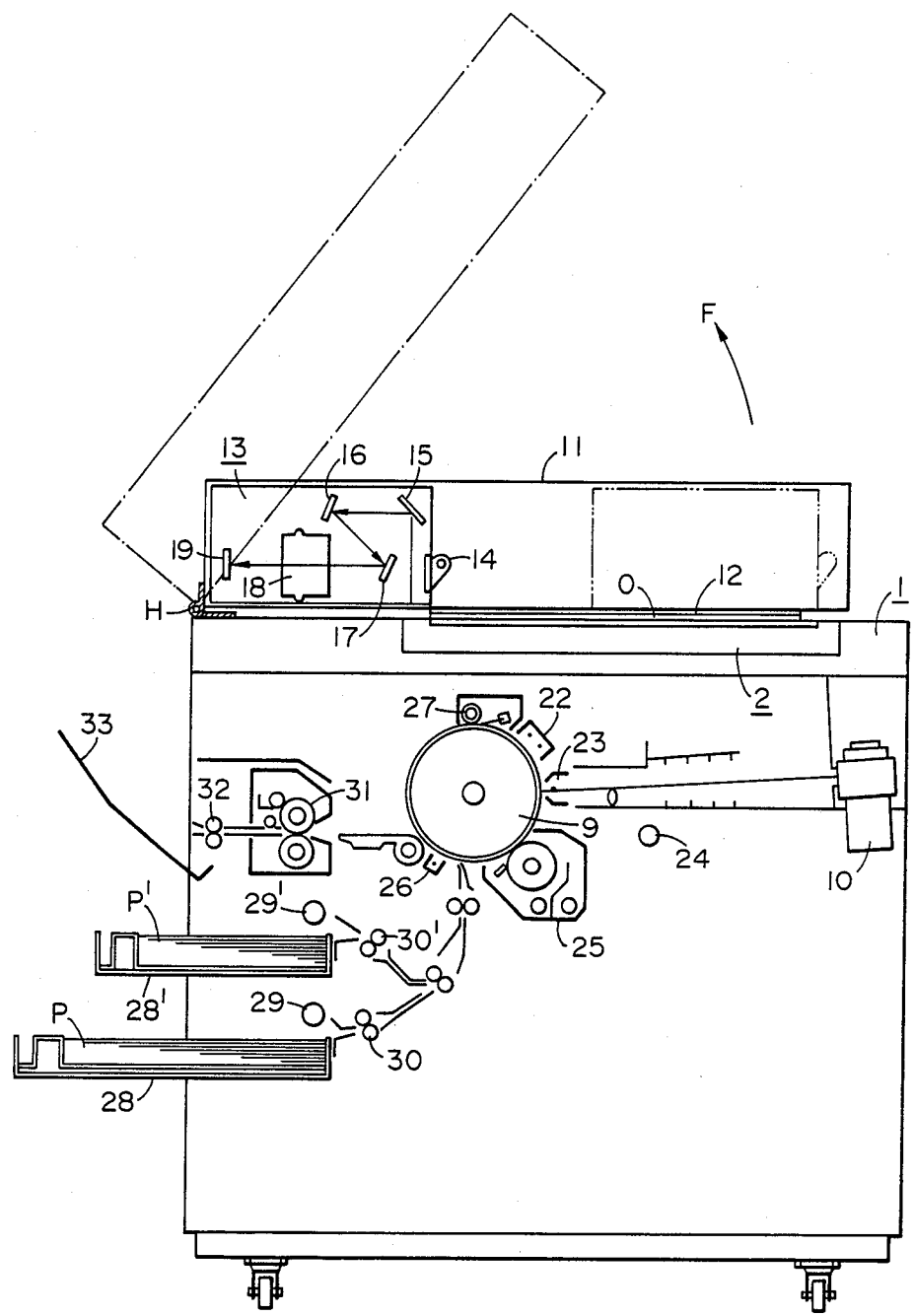
FIG. 1 is a cross-sectional view of an image formation apparatus to which the present invention is applied.
Figure 2:
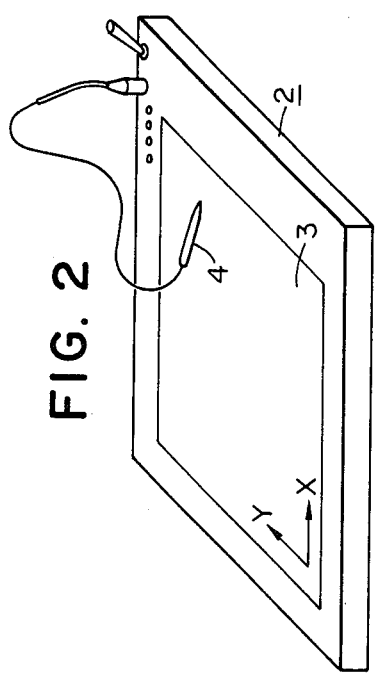
FIG. 2 is a perspective view of a tablet.

FIG. 1 illustrates an example of the image formation apparatus to which the present invention is applied. In FIG. 1, reference numeral 1 designates the body of the image formation apparatus and a tablet input device 2 is disposed on top thereof. The tablet input device 2, as shown in FIG. 2, comprises a tablet 3 and a stylus pen 4, and has the function of converting position designated by the stylus pen 4 into a digital two-dimensional coordinate information data and transferring it to the outside. The tablet 3 is what is called a digitizer, and it is a device which generates pen position information data by the operator operating the pen on an operating board on a flat plate. Such tablet is wellknown and therefore need not be described in detail herein. The upper surface of the tablet 3 is the surface for supporting an original 0 thereon. A laser beam scanning mechanism 10 for scanning a photosensitive drum 9 is disposed below the tablet input device 2.

Conventional process means, namely, a primary charger 22, a secondary charger 23, a whole surface exposure lamp 24, developing means 25, image transfer means 26, cleaning means 27, etc. are disposed around the photosensitive drum 9.

Transfer mediums P to which the image formed on the photosensitive drum 9 is to be transferred are contained in cassettes 28 and 28' and are fed seletively from one of these cassettes by a paper feed roller 29 or 29' and conveying rollers 30 or 30' and conveyed to an image transfer station by further feed means. After completion of the image transfer, the transfer medium is separated from the surface of the photosensitive drum by separating means, not shown, and then conveyed to fixing means 31. The transfer medium heat-fixed or pressure-fixed by the fixing means 31 is discharged onto a tray 33 by discharge rollers 32. In this manner, the scanned optical image by the laser beam scanning mechanism 10 is formed on the transfer medium, which is thus used.

Read-out means for obtaining video signals for modulating the laser beam scanned by the laser beam scanning mechanism 10 is constructed on a keep surface for holding down the original placed on the aforementioned original supporting surface. Designated by 11 is the housing of the read-out means, and an opening in which a transparent plate 12 is disposed is provided at a location in the underside of the housing 11 which is opposed to the tablet 3 providing the aforementioned original supporting surface. The underside of the transparent plate 12 provides the original keep surface. A scanning unit 13 is disposed so as to be movable on the transparent plate 12 from a position indicated by the solid line to a position indicated by the dotted line.

That is, the scanning unit 13 has incorporated therein an illuminating light source 14 for illuminating the original, mirrors 15, 16, 17 and imaging lens 18 fixed on the unit for directing the reflected light from the original to an image sensor 19, and a solid state image sensor 19 such as CCD which is irradiated with the reflected light from the original imaged by the lens 18 (the image sensor comprises, for example, 2048 light-receiving elements arranged linearly). This scanning unit 13 is reciprocally movable along a guide rail (not shown) provided within the housing 11. During the movement of the scanning unit 13 in one direction, the upwardly facing surface of the original resting on the original supporting surface is repeatedly scanned by the image sensor disposed perpendicularly to the direction of movement of the scanning unit to thereby obtain a video signal comprising the original information converted into an electrical signal. Of course, the video signal may also be obtained from the outside.

The thus obtained video signal is utilized to modulate the laser beam from the laser beam scanning mechanism 10 and such modulated beam repetitively scans in a direction perpendicular to the plane of the drawing sheet. By these beams, image formation is accomplished on the photosensitive drum 9. Of course, the read-out by the image sensor and the deflection of the laser beam are in synchronism with each other.

In the above-described image formation apparatus, the housing 11 is fixed to the apparatus body 1 by means of a hinge H and therefore, to place an original on the tablet 13, the housing 11 may be rotated in the direction of arrow F about the hinge H to bring about an open position as indicated by the dot-and-dash line, and the original may be placed with the housing 11 being in such position.

When a part of the original need not be copied or when only a part of the original need by copied, that part of the original is indicated by the pen 4, whereby the position on the original can be accurately read out by the tablet 3.

When the coordinates of said part have been input in this manner, the housing 11 is returned to its position indicated by the solid line without the original being moved to thereby bring about a closed position, whereafter the scanning unit 13 may be moved to read out the original.

In this case, the original may be placed so that the surfae thereof having the information to be copied faces upwardly as viewed in FIG. 1 and therefore, the aforementioned indication by the pen 4 can be effected directly on that surface having the information and the original need not be moved during copying, and this leads to the possibility that editing and copying can be carried out very accurately and quickly.

Figure 3:
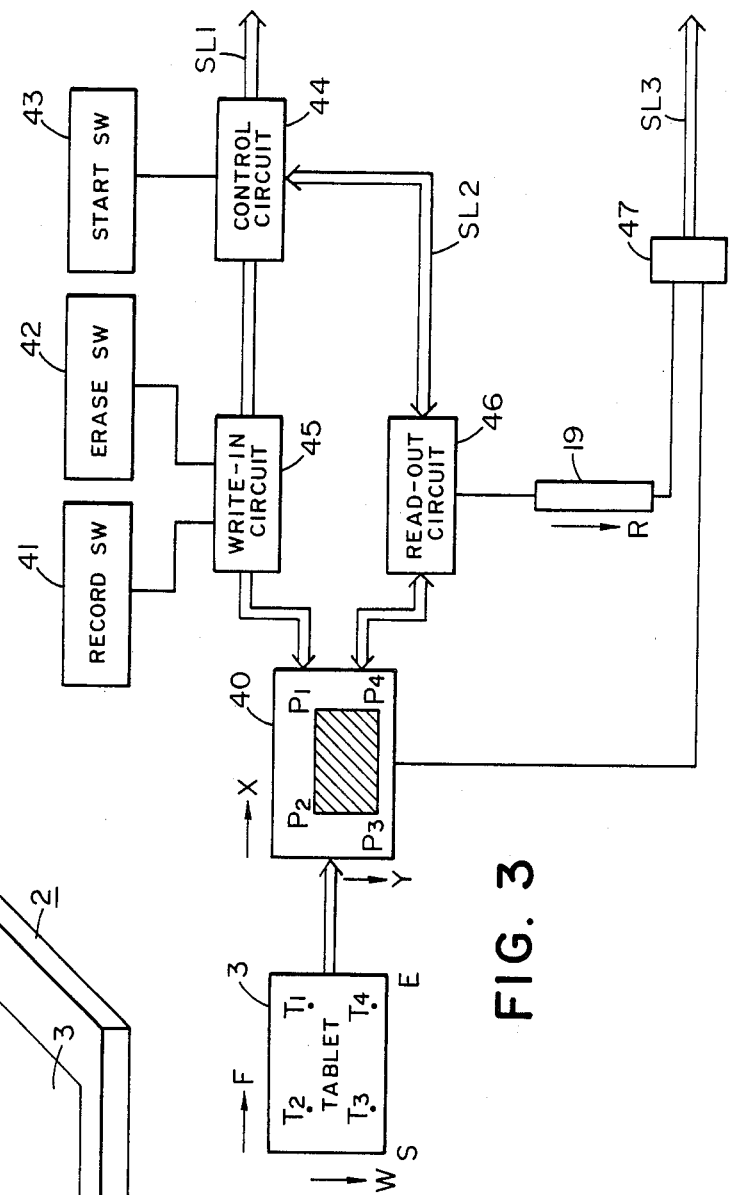
FIG. 3 is a diagram of a control circuit.

FIG. 3 shows the control circuit of such image formation apparatus. Coordinates T1, T2, T3 and T4 input onto the tablet 3 by the pen 4 are stored at corresponding positions P1, P2, P3 and P4 in a memory 40 having a storage capacity for storing image element information of one page of the original. Designated by 41 is a switch for instructing to record, during copying, the portion surrounded by the coordinates indicated by the pen 4 and erase the other portion, and denoted by 42 is a switch for instructing to erase, during copying, the portion surrounded by the coordinates indicated by the pen 4 and record the other portion. One of such switches 41 and 42 are selected.

When the indication by the pen 4 has been terminated in this manner, the housing 11 is closed as previously described and a copy start instruction switch 43 is depressed. When such instruction is put out, a write-in instruction is put out from a control circuit 44 to a write-in circuit 45 and, if the switch 41 is in its ON position, a digital "1" is written into the portion surrounded by coordinates P1, P2, P3 and P4 and "0" is written into the other portion, and, if the switch 42 is in its ON position, a digital "0" is written into the portion surrounded by coordinates P1, P2, P3 and P4 and "1" is written into the other portion. When such write-in has been terminated, a termination signal is sent from the write-in circuit 45 to the control circuit 44, which thus puts out a copy start instruction on a line SL1 and instructs to start movement of the scanning unit 13 and also instructs to start the other operation necessary for copying.

At the same time, the control circuit instructs to start the operation of a read-out circuit 46, which thus instructs the memory 40 and the image sensor 19 to effect readout. Assuming that the scanning unit 13 is moved in the direction of arrow F relative to the tablet 3 and that the direction of the scanning of the original by the memory 40 is effected in accordance therewith, that is, movement and read-out in the X-direction takes place while read-out in the Y-direction takes place repetitively, this repetitive read-out in the Y-direction being in synchronism with the repetitive read-out of the image sensor 19 in the R-direction, and the movement in the X-direction being in synchronism with the movement of the scanning unit.

The content of the memory 40 and the content of the image sensor 19 thus read out are applied to an AND gate 47, from which the output of the image sensor 19 is put out only when the digital "1" is read out from the memory 40.

Accordingly, by the aforementioned laser beam being modulated by the video signal on a signal line SL3, an image is formed on the drum in such a form that the information of the original masks the part indicated by the pen.

While the page memory 40 is used in the above-described embodiment, in order to reduce the storage capacity of the memory, the coordinates (x system and y system) indicated by the pen may be pre-stored and these coordinates may always be compared with the coordinates being scanned by the image sensor 19 so that the output of the image sensor 19 may be suppressed by the comparison output.

What we claim is:

1. An image formation apparatus for recording information in a designated area comprising:
    means for bearing an original thereon with one side of the original in contact with said bearing means and including position output means for generating a signal associated with a position on the original where direct designation is made on the opposite side of said original;
    means disposed to face the opposite side of the original for reading information by scanning the opposite side of the original and for forming an information signal;
    means for selecting one of first and second operating modes, wherein in the first mode the image information in the designated area is recorded and the image information outside the designated area is not recorded and in the second mode the image information in the designated area is not recorded and the image information outside the designated area is recorded;
    means responsive to the position signal from said position output means, the selected mode and the information signal from said information signal forming means for producing a recording signal; and
    recording means for recording information on a recording medium, said recording means being responsive to the recording signal from said recording signal producing means to thereby record the information on the recording medium either within the designated area of the original or outside the designated area.

2. An image formation apparatus according to claim 1, wherein said information signal forming means has a hinge member for making it openable and closable with respect to said position output means.

3. An image formation apparatus according to claim 1, wherein said recording means is positioned opposite to said information signal forming means with respect to said bearing means.

4. An image formation apparatus according to claim 1, wherein said recording means has a photosensitive drum and laser scanning means for scanning said drum by a laser beam.

5. An image formation apparatus for recording information in a designated area comprising:
   means for bearing an original thereon with one side of the original in contact with said bearing means and including position output means for generating a signal associated with a position on the original and indicating means for direct designation of the position on the opposite side of the original;
   scanning means disposed to face the opposite side of the original for reading information by optically scanning the opposite side of the original, said scanning means including photoelectric conversion means for forming an electric image signal;
   means for selecting one of first and second operating modes, wherein in the first mode the image information in the designated area is recorded and the image information outside the designated area is not recorded and in the second mode the image information in the designated area is not recorded and the image information outside the designated area is recorded; and
   information recording means for controlling the electric image signal obtained from said photoelectric conversion means by the scanning of the original by said scanning means and responsive to the signal obtained from said position output means and the selected mode, to thereby record on a recording medium the information either within the designated area of the original or outside the designated area.

6. An image formation apparatus for recording information in a designated area comprising:
   means for supporting an original thereon with one side of the original in contact with said supporting means and including position output means for generating a signal associated with a position on the original directly designated on the opposite side of the original;
   means disposed to face the opposite side of the original for reading information by scanning the opposite side of the original and for forming an information signal;
   selecting means for selecting to record on a recording medium the information on the original corresponding to the particular part designated and inhibit the recording of the information other than said particular part or to inhibit the recording on said recording medium of the information on the original corresponding to said particular part and effect the recording of the information other than said particular part; and
   recording means responsive to said selecting means for recording either the information corresponding to the particular part designated or the information other thanthe particular part on the recording medium.

7. An image formation apparatus according to claim 6, wherein said selecting means includes first switch means for selecting the recording of said particular part and second switch means for selecting the inhibiting of said particular part.

8. An image formation apparatus for recording information in a designated area comprising:
   means for bearing an original thereon with one side of the original in contact with said bearing means and including position output means for generating a signal associated with a position on the original directly designated on the opposite side of the original;
   means responsive to the signal generated from said position output means for storing the position signal;
   means disposed to face the opposite side of the original for reading information by scanning the opposite side of the original and for forming an information signal;
   means for selecting one of first and second operating modes, wherein in the first mode the image information in the designated area is recorded and the image information outside the designated area is not recorded and in the second mode the image information in the designated area is not recorded and the image information outside the designated area is recorded;
   means responsive to the information signal from said reading means and to the position signal stored in said storing means and the selected mode for producing a recording signal; and
   means responsive to the recording signal from said signal producing means for recording the information on a recording medium, wherein either the information in the designated area or the information outside the designated area is recorded.

9. An image formation apparatus according to claim 8, wherein said reading means comprises a light source, lens and an image sensor.

10. An image formation apparatus according to claim 8, wherein said original bearing means is arranged above said recording means.

11. An image formation apparatus for recording information in a designated area comprising:
   means for bearing an original thereon;
   means for forming an electrical image signal by reading image information from the original on said bearing means;
   means for designating a partial area of the original;
   means for selecting one of first and second operating modes, wherein in the first mode the image information in the designated area is recorded and the image information outside the designated area is not recorded and in the second mode the image information in the designated area is not recorded and the image information outside the designatedk area is recorded;
   means in response to the selected mode and the area signal for forming a record signal from the electrical image signal formed by said image signal forming means; and
   means in response to the record signal for recording on a recording medium either the information in the designated area or the information outside the designated area.

12. An image formation apparatus according to claim 11, wherein said selection means includes means for switching between the first mode and the second mode.

13. An image formation apparatus according to claim 11, wherein said area signal forming means includes means for storing information associated with the designated area.

14. An image formation apparatus according to claim 13, wherein said area signal storing means is operational in synchronism with the operation of said image signal forming means.

15. An image formation apparatus for recording information in a designated area comprising:
    means for forming an electrical image signal by reading image information from an original;
    means for designating a partial area of the original;
    means for storing an area signal representative of the designated area;
    means for selecting one of first and second operating modes, wherein in the first mode the image information in the designated area is recorded and the image information outside the designated area is not recorded and in the second mode the image information in the designated area is not recorded and the image information outside the designated area is recorded;
    means in response to the selected mode and the stored area signal for forming a record signal from the electrical image signal formed by said image signal forming means; and
    means in response to the record signal for recording on a recording medium either the information in the designated area or the information outside the designated area.

16. An image information apparatus according to claim 15, wherein said area designation means includes tablet means operable for inputting position information.

17. An image information apparatus according to claim 15, wherein said area signal storing means includes memory means, part of said memory means being associated with at least part of the designated area being changed.

18. An image information apparatus according to claim 15, wherein said area signal storing means is operative in synchronism with the operation of said image signal forming means.

19. An image formation apparatus comprising:
    means for designating a partial area of an original, said designating means having a platen corresponding to an original and an indication pen for designating said partial area with positions indicated on the platen surface by said indication pen;
    means for selecting one of first and second operation modes, wherein in the first mode the image in the designated area is recorded and the image outside the designated area is not recorded and in the second mode the image in the designated area is not recorded and the image outside the designated area is recorded; and
    means responsive to the area designation by said designating means and the mode selection by said selecting means for eliminating the image outside the designated area of the original and recording on a recording medium the image in the designated area or recording on a recording medium the image outside the designated area and eliminating the image in the designated area.

20. An apparatus according to claim 19, wherein said designating means forms coordinate data representing positions on the platen surface.

21. An apparatus according to claim 19, further comprising storing means for storing the data representing the area designated by said designating means.

22. An apparatus according to claim 19, further comprising scanning means for scanning the image of the original, wherein said recording means records an image according to the image scanned by said scanning means.

23. An apparatus according to claim 22, wherein said scanning means generates an electrical image signal representing the image scanned by said scanning means.

24. An image formation apparatus for recording information in a designated area comprising:
    means for forming an electrical image signal by reading an image from an original;
    means for designating a partial area of the original;
    means for generating an area designation signal representative of the designated partial area;
    means for selecting one of first and second operating modes, wherein in the first mode the image information in the designated area is recorded and the image information outside the designated area is not recorded and in the second mode the image information in the designated area is not recorded and the image information outside the designated area is recorded;
    means in response to the selected mode and the area designation signal for forming a record signal from the electrical image signal formed by said image signal forming means; and
    means responsive to the record signal for recording on a recording medium either the information in the designated area or the information outside the designated area.

* * * * *

UNITED STATES PATENT AND TRADEMARK OFFICE
CERTIFICATE OF CORRECTION

PATENT NO. : 4,745,491
DATED : May 17, 1988
INVENTOR(S) : HIROTOSHI KISHI, ET AL.  Page 1 of 2

It is certified that error appears in the above-identified patent and that said Letters Patent is hereby corrected as shown below:

COLUMN 2

Line 11, "wellknown" should read --well-known--.

COLUMN 3

Line 12, "tablet 13," should read --tablet 3,--.
Line 18, "by" should read --be--.
Line 29, "surfae" should read --surface--.

COLUMN 4

Line 4, "the mem-" should read --the image sensor 19 is the direction of arrow W, the scanning of the mem- --.

COLUMN 5

Line 64, "thanthe" should read --than the--.

COLUMN 6

Line 54, "designatedk" should read --designated--.

UNITED STATES PATENT AND TRADEMARK OFFICE
CERTIFICATE OF CORRECTION

PATENT NO. : 4,745,491
DATED : May 17, 1988
INVENTOR(S) : HIROTOSHI KISHI, ET AL.

Page 2 of 2

It is certified that error appears in the above-identified patent and that said Letters Patent is hereby corrected as shown below:

COLUMN 7

Line 30, "information" should read --formation--.
　　　Line 34, "information" should read --formation--.
　　　Line 39, "information" should read --formation--.

Signed and Sealed this

Twelfth Day of September, 1989

Attest:

DONALD J. QUIGG

*Attesting Officer*　　　　*Commissioner of Patents and Trademarks*